United States Patent
Bull et al.

[11] Patent Number: 6,075,803
[45] Date of Patent: Jun. 13, 2000

[54] SCALABLE VERTICALLY DIODE-PUMPED SOLID-STATE LASERS

[75] Inventors: Douglas J. Bull, Franklin, Mass.; Qiang Fu, Port Jefferson Station, N.Y.

[73] Assignee: Excel/Quantronix, Inc., East Setauket, N.Y.

[21] Appl. No.: 09/085,128

[22] Filed: May 27, 1998

[51] Int. Cl.[7] .............................. H01S 3/091; H01S 3/094
[52] U.S. Cl. ................................................ 372/75; 372/99
[58] Field of Search ........................................ 372/75, 99

[56] References Cited

U.S. PATENT DOCUMENTS

| | | |
|---|---|---|
| 5,080,706 | 1/1992 | Snyder et al. . |
| 5,081,639 | 1/1992 | Snyder et al. . |
| 5,155,631 | 10/1992 | Snyder et al. . |
| 5,181,224 | 1/1993 | Snyder . |
| 5,455,838 | 10/1995 | Heritier et al. . |
| 5,485,482 | 1/1996 | Selker et al. . |
| 5,548,608 | 8/1996 | Zhang ........................................ 372/75 |
| 5,572,541 | 11/1996 | Suni . |
| 5,640,408 | 6/1997 | Jani et al. ................................. 372/75 |
| 5,781,580 | 7/1998 | Winik ....................................... 372/75 |

Primary Examiner—Teresa M. Arroyo
Assistant Examiner—Robert E. Wise
Attorney, Agent, or Firm—Darby & Darby

[57] ABSTRACT

A method and apparatus pump a laser gain medium of a laser rod having a first longitudinal axis. At least one pump light source emits pump light to the laser rod, and the pump light source has a second longitudinal axis which is perpendicular to the first longitudinal axis. Radiation from various laser diode arrays is collimated and uniquely arranged in a vertical orientation in relation to the laser gain medium. Reflectors focus the collimated radiation from the diode arrays onto the laser gain medium to achieve fundamental mode operation or Transverse Electromagnetic mode (TEM00 mode) operation. Both laser gain medium and reflectors may be simultaneously cooled with appropriate fluids in the apparatus. The assembly of the apparatus may be extended to hold a plurality of vertically oriented laser diode arrays to increase the laser pump power.

17 Claims, 4 Drawing Sheets

SCALABLE VERTICALLY DIODE-PUMPED SOLID-STATE LASERS

BACKGROUND OF THE INVENTION

1. Field of the Invention

This disclosure relates generally to the field of lasers, and in particular to an assembly for slab geometry semiconductor lasers and a housing which allows close-coupling of many such semiconductor lasers to pump solid-state laser gain materials.

2. Description of Related Art

Arc lamps and flash lamps are commonly used as sources to excite or stimulate solid-state laser gain media. Such sources are typically positioned parallel to an elongated crystalline structure doped with a rare earth element such as neodymium (Nd) and/or other elements. The radiation emitted by the sources are partially absorbed by the solid-state laser gain medium, thereby stimulating the solid-state laser gain medium, and re-emitting radiation at a wavelength characteristic of the solid-state laser gain medium.

Such arc lamps or flash lamps in the prior art have known disadvantages as pump sources. For example, such lamps may generate a very broad radiation spectrum, but typically only a small fraction of the radiation spectrum is absorbed by the solid-state laser gain medium. In the prior art, broadband-emitting lamps for lasers, such as arc lamps and flash lamps, typically pump the entire solid-state laser gain medium of the solid-state laser indiscriminately, and thus much of the pump energy is directed to regions of the solid-state laser gain medium outside the region in which the Transverse Electromagnetic mode (TEM mode), such as TEM00, is occupying. Hence, much of the pump energy is not contributing to amplification of a single mode oscillation, but instead to various TEMs or multi-mode outputs.

Some relatively high efficiencies have been attained in high power semiconductor lasers fabricated from GaAs and GaAlAs materials by various methods known in the art, such as molecular beam epitaxy (MBE) and metallorganic chemical vapor deposition (MOCVD). Such fabricated semiconductor lasers have been used as relatively reliable pump sources for pumping the solid-state laser gain medium. One significant advantage of such semiconductor lasers is the ability to fabricate such lasers to emit radiation at specific wavelengths which match absorption values or bands of the solid-state laser gain medium used in the semiconductor laser.

Another significant advantage is the relatively good electrical-power-to-optical-radiation conversion efficiency associated with using such semiconductor lasers as pump sources. Conversion efficiencies greater than 50% have been attained in the prior art.

However, one known disadvantage of such semiconductor lasers is the relatively high degree of the divergence angle of the radiation emitted from the active region of the semiconductor laser. Typically, the angle of emission perpendicular to the active region is on the order of 40° at full width half maximum (FWHM), and the angle of emission parallel to the active region is on the order of 10° at FWHM. Such high divergence may be compensated using lenses, such as cylindrical micro-lenses developed at Lawrence Livermore National Laboratories. Lenses for use in lasers are described, for example, in U.S. Pat. Nos. 5,080,706; 5,081,639; 5,155,631; and 5,181,224. Various lens configurations may be used to collimate a laser beam from a semiconductor laser to improve the efficiency and performance of the semiconductor laser; for example, to collectively pump regions of the solid-state laser gain medium which more closely match the region of a TEM00 mode.

Accordingly, a need exists for a lens configuration for improving the performance of semiconductor lasers.

In the prior art, semiconductor laser bar arrays are positioned and oriented to be parallel to the solid-state laser gain medium when using a "side pumping" configuration, such as described, for example, in U.S. Pat. Nos. 5,455,838; 5,485,482; and 5,572,541. However, such side pumping configurations and designs are unable to achieve high power pumping power densities, on the order of about 100 W/cm. to about 200 W/cm. Accordingly, the solid-state laser gain medium is unable to be pumped from one side or even two sides thereof.

In order to increase the pumping power density, a multitude of laser bar arrays must be used, for example, by placing many laser bar arrays in numerous positions surrounding the solid-state laser gain medium. For example, configurations of numerous laser bar arrays having a three-fold, a five-fold, and even a seven-fold symmetry have been used. However, such multi-symmetric configurations are typically more complicated and cumbersome to implement, to maintain and repair, and to operate. Accordingly, such multi-symmetric configurations in the prior art have not been practical to implement, for example, to provide required power performance with acceptable costs of implementation.

Accordingly, a need exists for semiconductor lasers configured to provide improved performance with more practical implementations.

SUMMARY OF THE INVENTION

It is recognized herein that the positioning of pump sources with longitudinal axes perpendicular to the longitudinal axis of a laser rod, and the focussing of pump light from such pump sources, provides improved performance with better practical implementations.

Semiconductor lasers and their method of use and implementation are disclosed having semiconductor laser diode bar arrays which are positioned in a perpendicular configuration and orientation to the solid-state laser gain medium. The laser pump light emitted from each individual semiconductor laser diode bar array is collimated along the fast axis, and focussing of the collimated pump light onto the solid-state laser gain medium is performed by a plurality of different reflector plates in various different configurations for improved efficiency and performance to pump the solid-state laser gain medium.

Many semiconductor laser bar arrays may thus be positioned to surround the solid-state laser gain medium. The reflector plates are configured to enhance absorption of the solid-state laser gain medium. The pumping radiation is generated to pass through the solid-state laser gain medium more than once, thus increasing the optical absorption efficiency, and resulting in an increase in the optical output power of the solid-state laser gain medium.

The reflector plates may be arranged in alternating groups; for example, in a configuration of four groups, to optimize the pumping profile to be a TEM00 mode profile, and the pumping power density of between about 100 W/cm. and about 200 W/cm. may be achieved along the solid-state laser gain medium.

Accordingly, a laser apparatus is disclosed which has a laser rod having a first longitudinal axis and being composed of a solid-state laser gain medium; and at least one pump light source for providing pump light to the laser rod, wherein the pump light source has a second longitudinal axis which is perpendicular to the first longitudinal axis.

BRIEF DESCRIPTION OF THE DRAWINGS

The features and advantages of the disclosed pumped laser apparatus and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
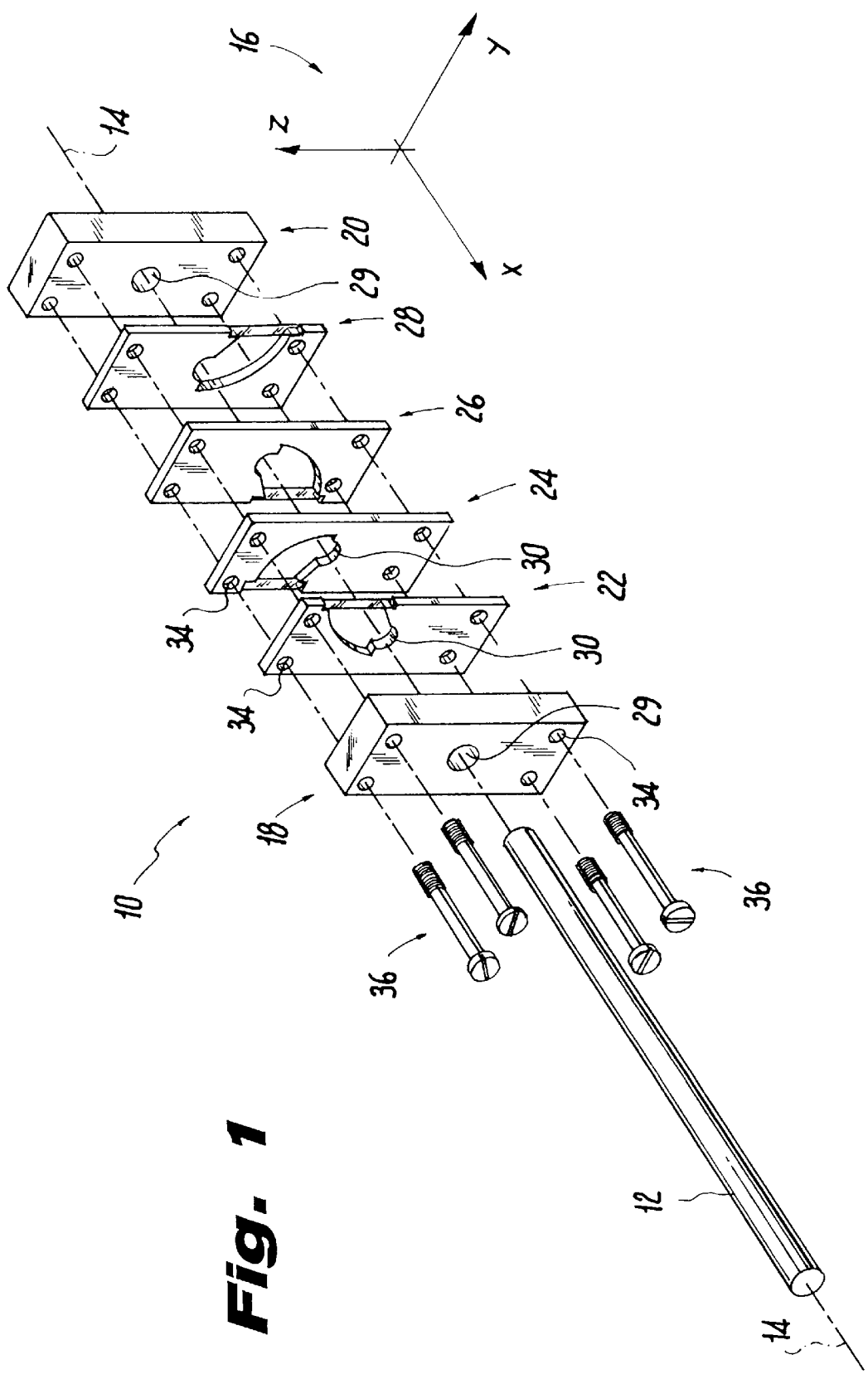
FIG. 1 illustrates the disclosed scalable vertically pumped laser apparatus with parts separated.

Referring in specific detail to the drawings, with common reference numbers identifying similar or identical elements, steps, and features, as shown in FIG. 1, the present disclosure describes a pumped laser apparatus and method for providing improved pumping power performance.

In FIG. 1, the apparatus 10 is configured to be scalable for pumping a solid-state laser gain medium such as a laser rod 12 which extends longitudinally along a rod axis 14. The laser rod 12 may be composed of solid-state materials such as Nd:YAG, Nd:Glass, Nd:YLF, Nd:LLGG, ruby, alexandrite, etc.

It is to be understood that other configurations of laser media such as laser slabs; laser discs, that is, cylindrically-shaped units of solid-state materials capable of lasing; and other laser media compositions may be used.

As described herein, without loss of generality, the apparatus 10 and the laser rod 12 are described as oriented with respect to a reference frame 16, having x-y-z axes, with the rod axis 14 of the laser rod 12 aligned with the x-axis. The apparatus 10 is an assembly of components including end subassemblies 18, 20, between which at least one reflector plate is positioned. In an illustrative embodiment, four reflector plates 22, 24, 26, 28 are shown.

Figure 2:
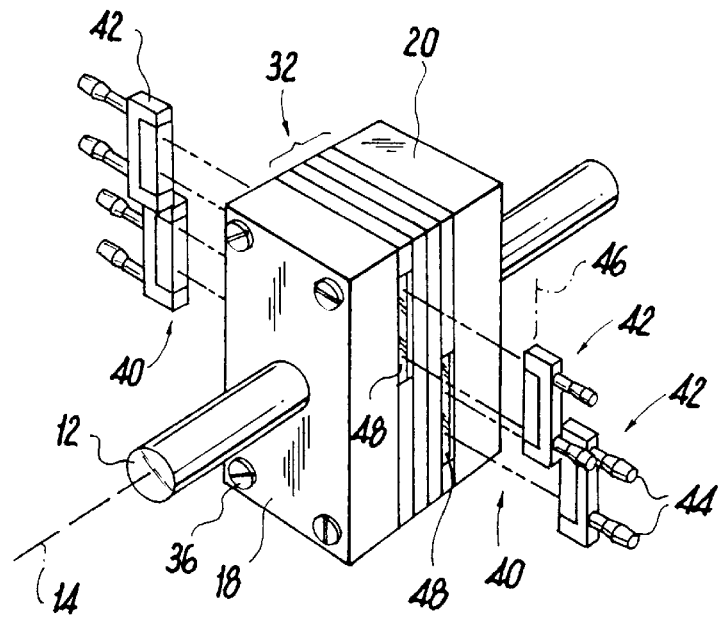
FIG. 2 illustrates the laser apparatus of FIG. 1 configured to form a scalable unit cell of a plurality of reflector plates.

The subassemblies 18, 20 and each of the reflector plates 22, 28 include respective apertures 29, 30 which are substantially aligned, for example, to form a substantially contiguous aperture through the apparatus 10 such that the laser rod 12 extends therethrough. The reflector plates 22, 24, 26, 28 may form a unit cell 32, as shown in FIG. 2, which is scalable; that is, a plurality of unit cells composed, for example, of the four reflector plates 22, 24, 26, 28 may be provided which extend along the longitudinal length of the laser rod 12. In addition, the number of reflector plates 22, 24, 26, 28 overall and/or within any unit cell 32 may be varied, and the relative widths of each plate may also be arbitrary. In an illustrative embodiment, each of the reflector plates 22, 24, 26, 28 has a common predetermined width.

Alternatively, each the reflector plates 22, 24, 26, 28 may have a predetermined width being an integer multiple of a minimum predetermined width. The use of scalable unit cells 32 of the reflector plates 22, 24, 26, 28 facilitates the assembly of reflector plates and/or unit cells of arbitrary overall length along the laser rod 12 having an arbitrary longitudinal length.

Each of the end subassemblies 18, 20 and the reflector plates 22, 24, 26, 28 includes at least one mounting hole 34 for engaging securing means, which may include mounting bolts 36 or alternatively rods, screws, other rod-like elements, or other fastening elements such as a vise apparatus, for aligning and/or holding the reflector plates 22, 24, 26, 28 such that, for example, the apertures 30 of all of the reflector plates 22, 24, 26, 28 are aligned to have the laser rod 12 disposed therethrough. Accordingly, by aligning the reflector plates 22, 24, 26, 28 with each other and with the end subassemblies 18, 20 using the securing means, the apparatus 10 may be securely assembled and disposed in a housing, described in greater detail below with respect to FIG. 6. In addition, such mounting holes 34 as well as the apertures 29, 30 allow the apparatus 10 to be scalable to any arbitrary length having an arbitrary number of reflector plates 22, 24, 26, 28 positioned with the laser rod 12 extending therethrough.

Figure 3:
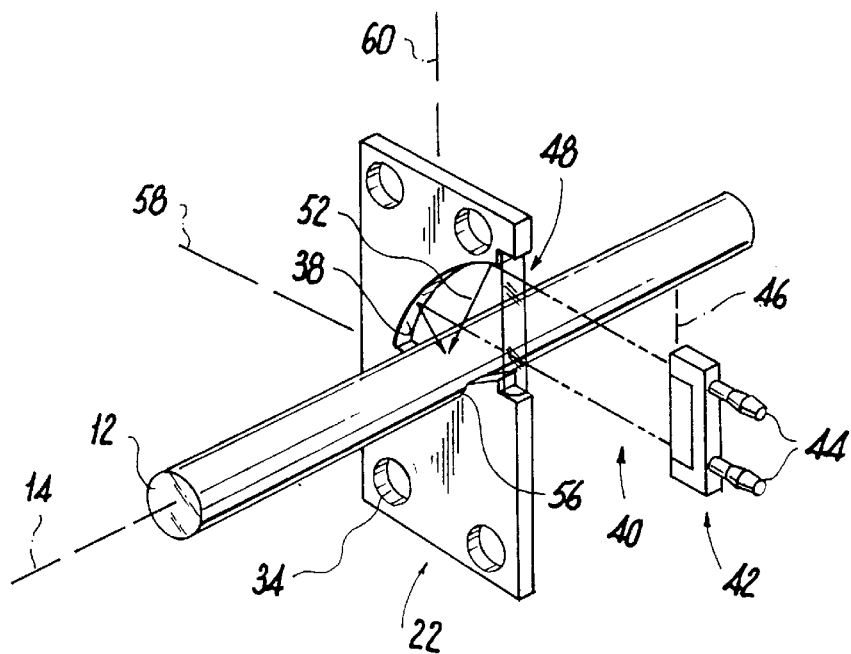
FIG. 3 illustrates a perspective view of a reflector plate receiving and focussing pump light.
Figure 4:
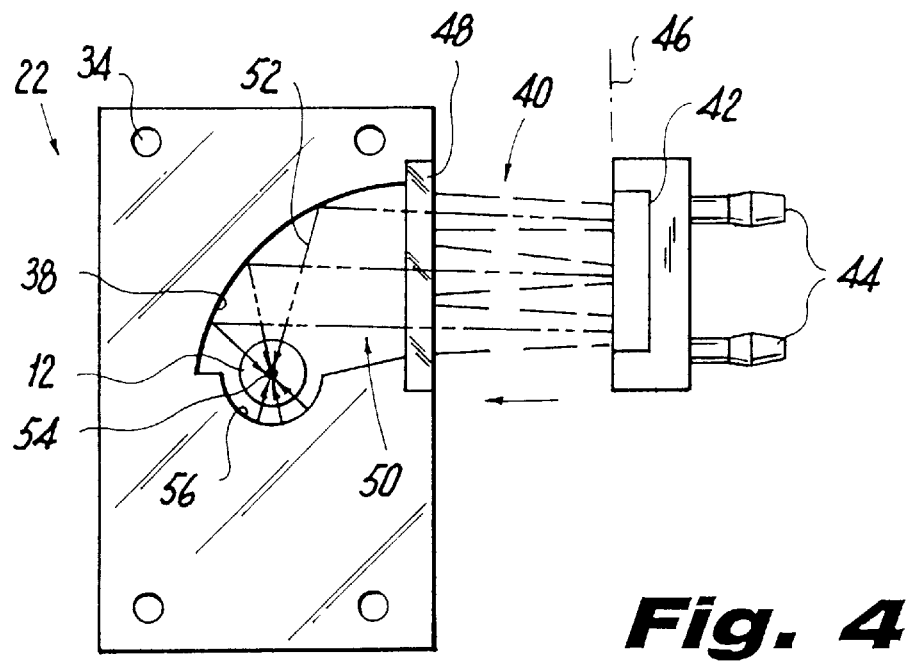
FIG. 4 illustrates a front plan view of the reflector plate of FIG. 3.

As shown in FIGS. 3–4 in conjunction with FIGS. 1–2, each of the reflector plates 22, 24, 26, 28 has a cut-out region forming a curved reflective surface, such as the parabolic reflective surface 38 of, for example, the reflector plate 22, which receives pump light 40 from a semiconductor laser array 42. It is to be understood that other curved reflective surfaces may be used besides, or in addition to, parabolic surfaces.

The semiconductor laser array 42 may be a bar or slab of semiconductor material, for example, a laser diode, or may be composed of other solid-state materials or combinations of various materials thereof, for generating pump light in, for example, a predetermined wavelength and/or a predetermined range of wavelengths. It is understood that other sources of pump light may be provided, such as incandescent and/or fluorescent light sources, and so the disclosed apparatus 10 is not limited to pump light 40 from semiconductors and/or from semiconductor lasers devices.

The semiconductor laser array 42 is mounted on a support structure 44 and extends longitudinally along an array axis 46. The array axis 46 of each of the semiconductor laser arrays 42 is oriented to be substantially perpendicular to the rod axis 14. In the illustrative embodiments shown in FIGS. 1–6, the array axis 46 is perpendicular to the x-axis. In particular, in FIGS. 1–4 and 6, the array axis 46 is parallel to the z-axis, and so the semiconductor laser arrays 42 are vertically oriented with respect to the horizontally oriented laser rod 12.

Figure 5:
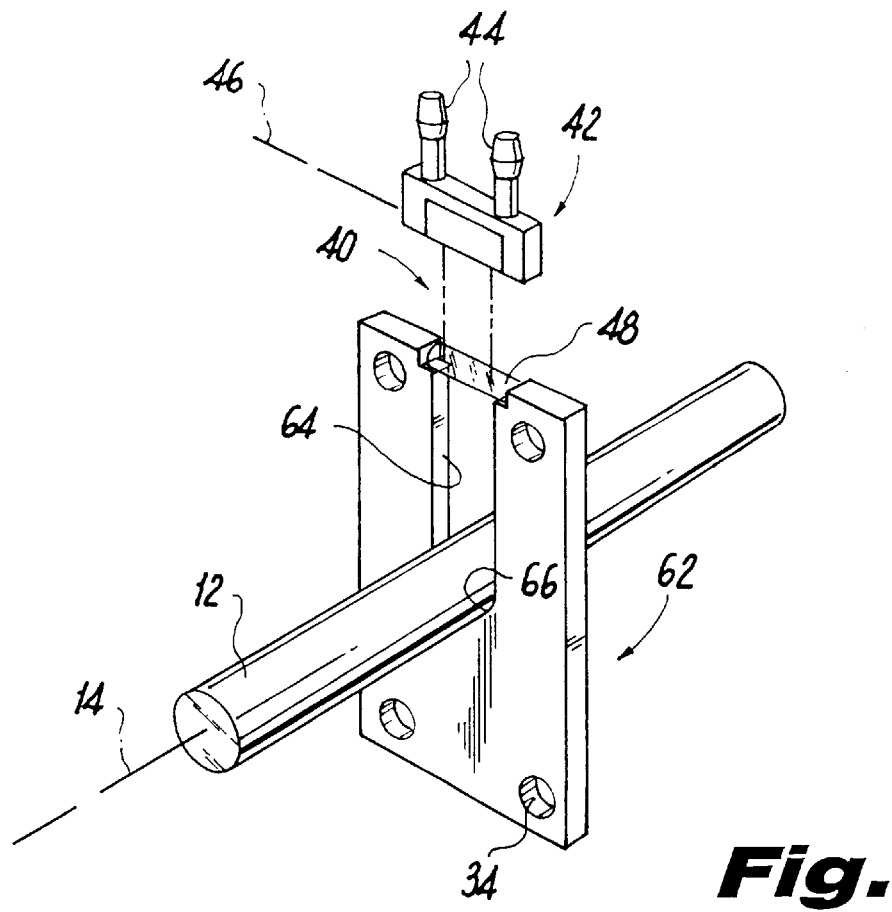
FIG. 5 illustrates an alternative embodiment of a reflector plate.

In the alternative embodiment shown in FIG. 5, the array axis 46 is parallel to the y-axis. It is to be understood that the disclosed apparatus 10 may be oriented such that rotations of the reflector plates 22–28 and the semiconductor laser arrays 42 about the x-axis maintain the perpendicularity of the longitudinal array axes 46 of the semiconductor laser arrays 42 relative to the longitudinal rod axis 14 of the laser rod 12. Accordingly, the configuration shown in FIG. 5 may be so rotated and/or viewed to have the semiconductor laser array 42 and/or its corresponding array axis 46 vertically oriented with respect to the rod axis 14.

Due to the orientation of the array axes 46, each semiconductor laser array 42 emits pump light 40 generally in a direction perpendicular to the rod axis 14. In particular, the pump light 40 is emitted substantially in the y-z plane toward at least one respective reflector plate, such as the reflector plate 22 shown in FIGS. 3–4.

Such pump light 40, even as laser light, may experience a degree of dispersion during generation and/or emission, as shown in FIG. 4. Accordingly, the pump light 40 is collimated by a respective collimating lens 48 of the respective reflector plates 22, 24, 26, 28. Such collimating lenses 48 are described, for example, in U.S. Pat. Nos. 5,080,706; 5,081,639; 5,155,631; and 5,181,224; each of which is incorporated herein by reference.

The collimating lens 48 may be a separate component disposed and/or mounted at the opening of the cut-out region to receive the pump light 40. Alternatively, the collimating lenses 48 may be incorporated directly into the reflector plates 22, 24, 26, 28. For example, the collimating lenses 48 may be integral with the composition of each of the respective reflector plates 22, 24, 26, 28.

The collimating lenses 48 reduce the relatively wide divergence angle of emission of the pump light from the semiconductor laser arrays 42 along the fast axis. Accordingly, a significant portion of the pump light 40 is transmitted in the cut-out portion as collimated pump light to the parabolic reflective surface 38.

Referring to FIG. 4 in conjunction with FIG. 3, the parabolic reflective surface 38 of each of the reflector plates 22, 24, 26, 28 receives the collimated pump light 50, and in turn, reflects the pump light as reflected pump light 52 to the focus 54 of the parabolic reflective surface 38. Each of the reflector plates 22, 24, 26, 28 also includes the respective aperture 30. In particular, apertures 30 may not be of identical shape. As shown in FIGS. 1 and 3–5, the cut-out portion is substantially adjacent to the respective apertures 30, 56, 66 of the reflector plates 22, 24, 26, 28 and 62, respectively, with such apertures 30 being circular in shape; that is, forms the shape of an arc of a circle, and which is positioned such that the center/focus of the arc of the apertures 30 is substantially aligned with the focus 54 of the parabolic reflective surface 38.

The laser rod 12 is disposed in the apertures 30 so as to lie in the focus 54. In particular, the longitudinal rod axis 14 of the laser rod 12 passes through each of the foci 54 of the apertures 30 of the reflector plates 22, 24, 26, 28. Accordingly, the reflected pump light 40 is focussed on the laser rod 12 for efficiently pumping the laser rod 12 as the solid-state laser gain medium.

In addition, the aperture 30 of each of the reflector plates 22, 24, 26, 28 may have a reflective surface 56 to reflect any of the pump light which passes through the laser rod 12 but which is not absorbed by the laser rod 12 for pumping. Such reflected pump light from the reflective surface 56 is emitted back to the laser rod 12 to further pump the laser rod 12. Such second pass pumping of the laser rod 12 by reflection improves the efficiency of the pumping of the laser rod 12. Additional reflections and passes may also occur from further reflections onto the laser rod 12 of the second pass pump light by the reflective surface 38 and the reflective surface 56. It is to be understood that other shapes of the reflective surfaces 38, 56 may be implemented to provide focussing of the pump light 40 onto the laser rod 12. For example, the reflector plates 22, 24, 26, 28 may have different curvatures which overall form a paraboloid reflective surface extending in three-dimensions along the x-y-z axes to capture, converge, and focus light from a vertically oriented semiconductor laser bar array 42.

As shown in FIGS. 1 and 3–4, except for the parabolic cut-out portion, the reflector plates 22, 24, 26, 28 may be axially symmetrical about axes 58, 60 of symmetry, for example, parallel to the y-axis and about the z-axis, respectively. Accordingly, each of the reflector plates 22, 24, 26, 28 may be manufactured to be identical, including having identical the cut-out portions, and each of the reflector plates 22, 24, 26, 28 may be oriented in the apparatus 10 by appropriate rotation about one or both axes 58, 60 of symmetry to have the collimating lens 48 oriented toward a respective semiconductor laser array 42.

Each semiconductor laser array 42 may be mounted by a respective support structure 44 onto a frame (not shown in FIGS. 1–6), such that each semiconductor laser array 42 is positioned having the longitudinal array axis 46 perpendicular to the longitudinal rod axis 14. By providing a plurality of semiconductor laser arrays 42 mounted and arranged in a specific configuration for emitting the pump light 40 to the laser rod 12, the close-coupling of many such semiconductor lasers is provided to pump the solid-state laser gain medium of the laser rod 12.

Alternatively, each semiconductor laser array 42, via the respective support structures 44, may be removably mounted to the frame for facilitating tests and replacement of any specific semiconductor laser array 42 in the event of failure of the specific semiconductor laser array 42, while leaving the remaining semiconductor laser arrays 42 mounted and operating the apparatus 10 to pump the laser rod 12.

In an alternative embodiment, shown in FIG. 5, a reflector plate 62 may have a cut-out portion and a reflective surface 64 oriented for use with a semiconductor laser array 42 having the array axis 46 perpendicular to the longitudinal rod axis 14 of the laser rod 12 and parallel to the y-axis. In the configuration shown in FIG. 5, the semiconductor laser array 42 is horizontally oriented relative to the horizontally oriented laser rod 12, but with the semiconductor laser array 42 and the pump light 40 emitted therefrom being perpendicular to the rod axis 14.

As with the reflective surface 38 of FIG. 4, the reflective surface 64 of the reflector plate 62 of FIG. 5 may be parabolic for focusing the pump light 40, collimated by the collimating lens 48, to a focus at which the laser rod 12 is disposed. A second reflective surface 66 may be a circular arc for causing a second pass of unabsorbed pump light. Alternatively, the reflective surface 64 may be linear or may have other shapes, for example, to allow the pump light 40 to be guided to the laser rod 12 for efficient pumping of the laser gain medium thereof.

In one embodiment of the disclosed pumped laser apparatus 10, the apparatus 10 is shown in FIG. 1 in an exploded perspective view with parts separated. The components may be assembled as shown in FIG. 2 to have the laser rod 12 centrally axially disposed to extend through the reflector plates 22, 24, 26, 28 and end assemblies 18, 20 to be pumped by at least one semiconductor laser array 42 which is aligned with a longitudinal array axis 46 perpendicular to the longitudinal rod axis 14 of the laser rod 12.

The apertures 29, 30 in the reflector plates 22, 24, 26, 28 and/or the end assemblies 18, 20 may have a greater cross-sectional area than the laser rod 12, in order to allow coolant to pass through the apertures 30 and thus around the laser rod 12 to cool the solid-state laser gain medium composing the laser rod 12 to permit the pump light 40 to efficiently pump the laser rod 12. Alternatively, the apertures 29, 30 may have a cross-sectional profile substantially identical to the cross-sectional profile of the laser rod 12 but each of the apertures 29, 30 may also include a notch (not shown in FIG. 1) for permitting passage of the coolant through the apertures 29, 30 and substantially adjacent to the laser rod 12.

In an alternative embodiment, the apparatus 10 may have the reflector plates 22, 24, 26, 28 separated as shown in FIG. 1, with the reflector plates 22, 24, 26, 28 mounted on a frame (not shown) at predetermined distances to allow coolant to be applied through the spacing between the reflector plates 22, 24, 26, 28 to the laser rod 12 to cool the solid-state laser gain medium composing the laser rod 12.

Figure 6:
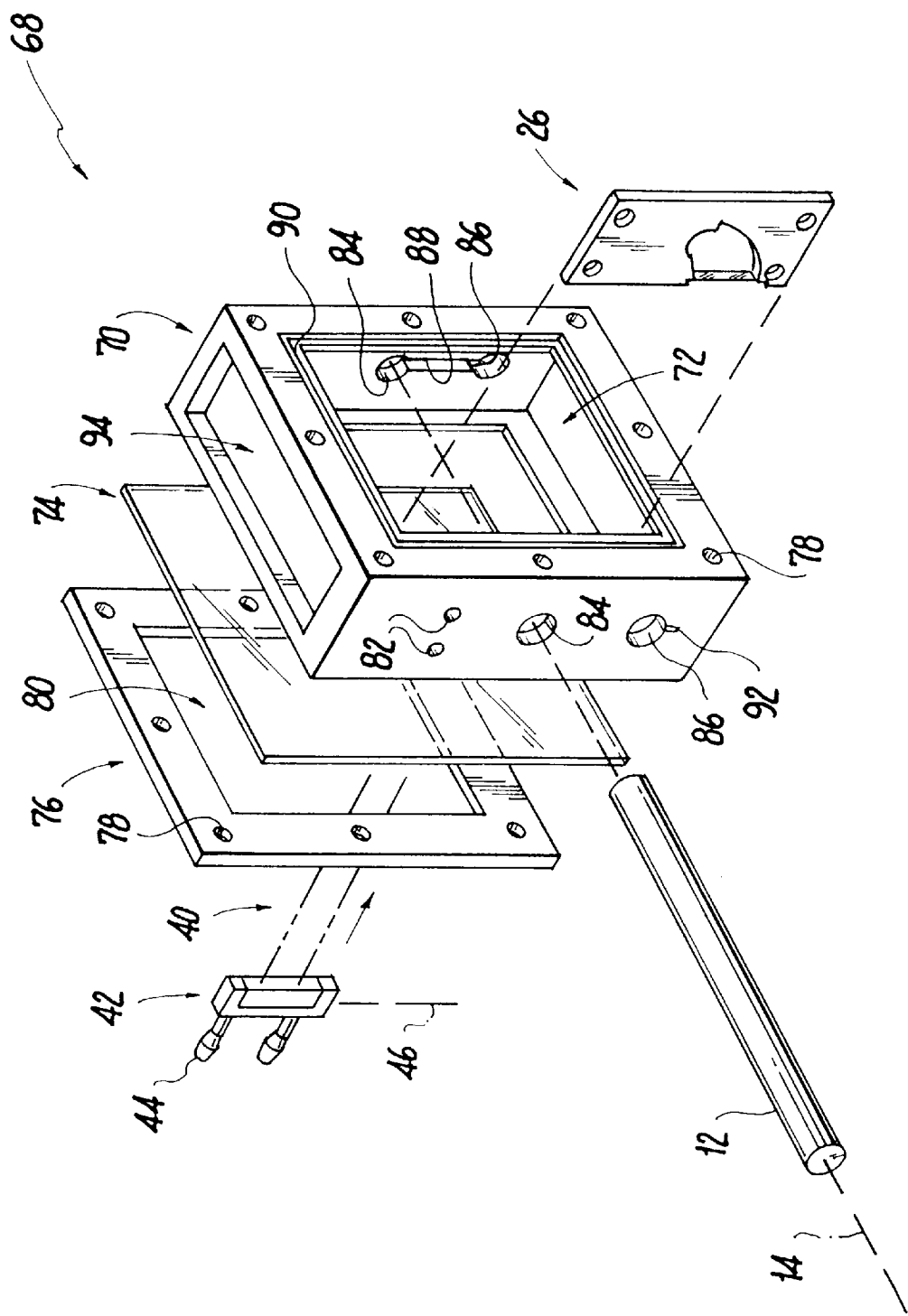
FIG. 6 illustrates an alternative embodiment of the laser apparatus of FIG. 1 with a housing.

In another embodiment, the apparatus 10 of FIG. 1 may be housed in an assembly 68 shown in FIG. 6. The assembly 68 includes a housing 70 which may be constructed from various types of materials, such as stainless steel, "TEFLON" (polytetrafluoroethylene), etc. The housing 70 has a hollow cavity 72 proportioned to accommodate at least one reflector plate such as the reflector plate 26.

The assembly 68 also includes at least one enclosing plate 74 and at least one plate holder 76 for securing the enclosing plate 74 to the housing 70 using, for example, holding means such as screws mounted in apertures such as tapped mounting holes 78 in the plate holder 76 and the housing 70. The enclosing plate 74 may be composed of transparent glass for permitting transmission of pump light. Alternatively, the enclosing plate 74 may be coated for filtering specific wavelengths and for reflective and anti-reflective characteristics.

For illustrative purposes, FIG. 6 shows a single enclosing plate 74 and a single plate holder 76 on one side of the housing 70, and a single reflector plate 26 to be positioned in the housing 70 for receiving the pump light 40 through the enclosing plate 74, with the collimating lens 48 and the cut-out portion appropriately oriented toward the semiconductor laser array 42.

It is to be understood that the assembly 68 of FIG. 6, when fully assembled, includes at least two enclosing plates 74 and at least two plate holders 76 on diametrically opposite sides of the housing 70 to effectively seal the housing 70 with at least one reflector plate disposed therein, such as the plurality of reflector plates 22, 24, 26, 28 forming a unit cell 32 shown in FIG. 2.

The enclosing plates 74 may be anti-reflection coated to increase the transmittance through the enclosing plates of the pump light 40 from the semiconductor laser arrays 42, and so to increase the energy incident upon the solid-state laser gain medium composing the laser rod 12. It is to be understood that other planar structures of compositions different from glass may be used, such as quartz, plastics, etc., instead of enclosing plates 74.

The plate holders 76 may be composed of stainless steel, other metals, plastic, glass, etc., and include a cut-out area 80 or opening to permit the pump light 40 from the semiconductor laser arrays 42 to pass through the enclosing plates 76 to enter the cavity 72 in which the reflector plates 22, 24, 26, 28 and the laser rod 12 are disposed.

With the reflector plates 22, 24, 26, 28 positioned in the housing 70, at least one locking screw may extend through at least one mounting aperture 82 to engage and secure the reflector plates 22, 24, 26, 28 in the cavity 72. Sealing means such as an O-ring and/or a washer disposed in the mounting aperture 82 may be used in conjunction with the locking screw in the mounting aperture 82 to prevent coolant leakage.

The housing 70 includes at least one rod aperture 84 through which the laser rod 12 extends. The housing 70 may also include at least one coolant flow aperture 86 and at least one slot 88 for providing a path for the flow of coolant on and about the laser rod 12 extending through rod apertures 84. The slot 88 causes the coolant to be directed to and to flow along and around the laser gain medium to lower the temperature of the solid-state laser gain medium composing the laser rod 12, and so to allow the solid-state laser gain medium to function efficiently.

As shown in FIG. 6, the housing 70 may also include a seal cavity 90 in which sealing means such as an O-ring or epoxy may be disposed to hermetically seal the enclosing plates 74 with the cavity 72 of the housing 70. A single seal cavity 90 is shown in FIG. 6, but it is to be understood that such seal cavities 90 may be disposed on diametrically opposite sides of the housing 70.

The housing 70 may also including monitor apertures in which a sensor or other monitoring means may be positioned. For example, the monitor aperture 92 may be provided as shown in FIG. 6 to allow a thermocouple to be positioned therein to detect the temperature of the coolant passing through the coolant flow aperture 86.

In the reflector plates 22, 24, 26, 28 shown in FIGS. 1–4 and 6, the semiconductor laser arrays 42 are vertically oriented; that is, the semiconductor laser array 42 has an axis perpendicular to the longitudinal axis of the laser rod 12 and parallel to the z-axis. The cut-out portion of each of the reflector plates 22–28 extends from the side of each respective reflector plate facing the semiconductor laser array 42. The reflector plates 22–28 and semiconductor laser arrays 42 are oriented to have the illustrated vertical orientation within the cavity 72 of the housing 70.

In an alternative embodiment for use with the reflector plate 62 shown in FIG. 5, the housing 70 of FIG. 6 may be modified to have an optional opening 94 or slot on an upper surface which is, for example, substantially parallel to the x-y plane. The semiconductor laser arrays 42 may be positioned by a support structure and/or a frame, and may be removably mounted, to be positioned over the opening 94 to be horizontally oriented to emit pump light down through the opening 94 shown in FIG. 6, and so into the cut-out portions of the reflector plate 62 shown in FIG. 5, with the reflector plate 62 positioned within the cavity 72 of the housing 70.

Accordingly, the use of such reflector plates to focus the collimated radiation from the semiconductor arrays 42, such as diode arrays onto the laser gain medium may be used to achieve fundamental mode operation or Transverse Electromagnetic mode (TEM00 mode) operation. The reflector plates may be arranged in alternating groups; for example, in a configuration of four groups, to optimize the pumping profile to be a TEM00 mode profile, and the pumping power density of between about 100 W/cm. and about 200 W/cm. may be achieved along the solid-state laser gain medium.

While the disclosed pumped laser apparatus 10 and method are particularly shown and described herein with reference to the preferred embodiments, it is to be understood that various modifications in form and detail may be made without departing from the scope and spirit of the present invention.

For example, the reflector plates 22, 24, 26, 28 may be composed of glass, and, instead of a cut-out portion, may be a solid plate with an aperture such as aperture 30 therethrough and being composed of two substances with different indices of refraction. The parabolic reflective surface 38 may then be formed as a parabolically shaped junction between the two substances to provide reflection due to the different indices of refraction to focus the pump light, as described above. The collimating lens 48 may then be formed from a portion of a side of each of the reflector plates 22, 24, 26, 28.

In addition, the laser rod 12 is not required to be linear or substantially linear, but may be curved, with the securing means such as the mounting bolt 36 or rod-like element being correspondingly curved to assembly the plurality of reflector plates along the curved length of the laser rod 12.

Furthermore, it is to be understood that the term "light", as used throughout the present disclosure, is not limited to optical light, but may also include any electromagnetic wave, such as infrared and microwave wavelength signals, for pumping a laser gain medium. Therefore, the reflective surfaces 38, 56, and 64–66 may be appropriately reflective of such incident electromagnetic waves, and the enclosing plate 74 may be appropriately transparent to such incident electromagnetic waves. Accordingly, modifications such as any examples suggested herein, but not limited thereto, are to be considered within the scope of the present invention.

What is claimed is:

1. A laser apparatus comprising:
   a laser rod having a first longitudinal axis and being composed of a laser gain medium;
   a pump light source for providing pump light to the laser rod, wherein the pump light source has a second longitudinal axis which is perpendicular to the first longitudinal axis; and
   a plurality of reflector plates each having at least one reflective surface for reflecting the pump light to the laser rod, each of the plural reflector plates having an associated aperture substantially aligned with one another and sized so that said laser rod extends therethrough.

2. The laser apparatus of claim 1 wherein the pump light source includes at least one laser bar array for emitting the pump light toward the laser rod in a direction substantially perpendicular to the first longitudinal axis.

3. The laser apparatus of claim 2 further comprising:
   mounting means for mounting the at least one laser bar array to be perpendicular to the first longitudinal axis.

4. The laser apparatus of claim 1 wherein the at least one reflective surface is curved in a plane perpendicular to the first longitudinal axis.

5. The laser apparatus of claim 1 wherein the at least one relfective surface is curved in an arc of a parabola with the laser rod positioned at the focus of the parabola.

6. The laser apparatus of claim 5 wherein the pump light is reflected by the parabolically-shaped reflective surface toward the laser rod at the focus.

7. The laser apparatus of claim 6 further comprising:
   a collimating lens for collimating the pump light; and
   wherein the parabolically-shaped reflective surface reflects the collimated pump light toward the laser rod at the focus.

8. The laser apparatus of claim 1 wherein the at least one reflective surface includes:
   a first reflective surface curved in an arc of a parabola with the laser rod being positioned at the focus of the parabola for reflecting the pump light to the laser rod in a first pass; and
   a second reflective surface curved in an arc of a circle with the laser rod being positioned at the focus of the circle for reflecting unabsorbed pump light from the first pass to the laser rod in a second pass.

9. The laser apparatus of claim 1 further comprising:
   securing means for mounting the plurality of reflector plates in a unit cell.

10. The laser apparatus of claim 9 wherein each of the plurality of reflector plates includes mounting holes; and
    wherein the securing means includes:
    at least one end assembly having a mounting hole to permit a rod-like element to extend through the mounting holes of the plurality of reflector plates and the end assembly for mounting the plurality of reflector plates in a unit cell.

11. The laser apparatus of claim 9 wherein the number of reflector plates is scalable to any predetermined number.

12. A laser apparatus comprising:
    a housing having a cavity;
    at least one glass plate for passing pump light into the cavity;
    a laser rod positioned in the cavity, the laser rod having a first longitudinal axis and being composed of a laser gain medium;
    a plurality of laser bar arrays for emitting the pump light toward the laser rod and through the at least one glass plate in a direction substantially perpendicular to the first longitudinal axis, wherein each of the laser bar arrays has a respective second longitudinal axis oriented perpendicular to the first longitudinal axis; and
    a plurality of reflector plates each having at least one reflective surface for reflecting the pump light to the laser rod, each of said plural reflector plates having an associated aperture substantially aligned with one another and sized so that said laser rod extends therethrough.

13. The laser apparatus of claim 12 wherein the at least one reflective surface includes:
    a first reflective surface curved in an arc of a parabola with the laser rod being positioned at the focus of the parabola for reflecting the pump light to the laser rod in a first pass; and
    a second reflective surface curved in an arc of a circle with the laser rod being positioned at the focus of the circle for reflecting unabsorbed pump light from the first pass to the laser rod in a second pass.

14. The laser apparatus of claim 12 wherein the housing includes:
    a coolant aperture for passing coolant through the cavity to cool the laser rod.

15. A method for pumping a laser rod with pump light, the laser rod having a first longitudinal axis and being composed of a laser gain medium, the method comprising the steps of:
    positioning a plurality of laser bar arrays to emit the pump light toward the laser rod, wherein each of the plurality of laser bar arrays has a respective second longitudinal axis oriented perpendicular to the first longitudinal axis;
    emitting the pump light toward the laser rod in a direction substantially perpendicular to the first longitudinal axis; and
    collimating the pump light with a collimating lens; and
    reflecting the collimated pump light, using a plurality of reflective plates each having at least one reflective surface, toward a focal point of the at least one reflective surface, each of said plural reflector plates having an associated aperture substantially aligned with one another and sized so that said laser rod extends therethrough and is positioned at the focal point of the at least one reflective surface.

16. The method of claim 15 wherein the reflecting step comprises:
reflecting the collimated pump light using a first reflective surface curved in an arc of a parabola with the laser rod being positioned at the focus of the parabola for reflecting the pump light to the laser rod in a first pass.

17. The method of claim 16 wherein the step of reflecting further includes the step of:
reflecting unabsorbed pump light from the first pass to the laser rod in a second pass using a second reflective surface curved in an arc of a circle with the laser rod being positioned at the focus of the circle.

* * * * *